(12) United States Patent
Kang et al.

(10) Patent No.: US 8,775,954 B2
(45) Date of Patent: Jul. 8, 2014

(54) MOBILE TERMINAL TO DISPLAY A PLURALITY OF GRAPHIC USER INTERFACES

(75) Inventors: Rae Hoon Kang, Seoul (KR); Young Jun Kim, Seoul (KR); Jae Seok Han, Incheon (KR); Choon Jae Lee, Gwangju (KR); Min Hak Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 524 days.

(21) Appl. No.: 12/840,403

(22) Filed: Jul. 21, 2010

(65) Prior Publication Data

US 2011/0022958 A1 Jan. 27, 2011

(30) Foreign Application Priority Data

Jul. 21, 2009 (KR) ........................ 10-2009-0066231

(51) Int. Cl.
*G06F 3/048* (2013.01)
*G06F 3/00* (2006.01)

(52) U.S. Cl.
USPC .......................................... 715/764; 715/716

(58) Field of Classification Search
CPC ...................................................... G06F 9/4443
USPC ................................................. 715/716, 764
See application file for complete search history.

(56) References Cited

U.S. PATENT DOCUMENTS

| 7,761,800 | B2* | 7/2010 | Chaudhri et al. | ............. 715/764 |
| 2006/0235913 | A1 | 10/2006 | Jeong | |
| 2007/0101291 | A1* | 5/2007 | Forstall et al. | ................ 715/805 |
| 2007/0118813 | A1 | 5/2007 | Forstall et al. | |
| 2008/0034314 | A1 | 2/2008 | Louch et al. | |
| 2008/0307364 | A1* | 12/2008 | Chaudhri et al. | ............. 715/836 |
| 2009/0024944 | A1* | 1/2009 | Louch et al. | ................. 715/765 |
| 2009/0094557 | A1* | 4/2009 | Howard | ........................ 715/848 |
| 2009/0260022 | A1* | 10/2009 | Louch et al. | ................. 719/328 |
| 2009/0307300 | A1* | 12/2009 | Guedalia et al. | ............. 709/202 |
| 2010/0167712 | A1* | 7/2010 | Stallings et al. | ............. 455/418 |
| 2010/0287479 | A1* | 11/2010 | Pell et al. | ...................... 715/744 |

FOREIGN PATENT DOCUMENTS

| CN | 1574873 | 2/2005 |
| CN | 101069198 | 11/2007 |

OTHER PUBLICATIONS

Chinese Office Action dated May 6, 2013 and English translation.
European Search Report dated Sep. 6, 2013 for corresponding Application No. 10007587.8.

* cited by examiner

*Primary Examiner* — William Bashore
*Assistant Examiner* — Henry Orr
(74) *Attorney, Agent, or Firm* — KED & Associates LLP

(57) ABSTRACT

The present invention relates to a mobile terminal, which displays at least one graphic user interface (hereinafter abbreviated GUI) on a standby picture. The present invention includes a display unit configured to display a plurality of graphic user interfaces and a controller, when a state of a specific one of a plurality of the graphic user interfaces is changed, the controller controlling at least one of a display type, a applied visual effect, a play content and an arranged position of at least one of the rest of the graphic user interfaces except the specific graphic user interface to be changed to correspond to the changed state, wherein the arranged position indicates a position of the corresponding graphic user interface displayed on the display unit.

10 Claims, 20 Drawing Sheets

MOBILE TERMINAL TO DISPLAY A PLURALITY OF GRAPHIC USER INTERFACES

CROSS-REFERENCE TO RELATED APPLICATION(S)

Pursuant to 35 U.S.C. §119(a), this application claims the benefit of earlier filing date and right of priority to Korean Application No. 10-2009-66231, filed on Jul. 21, 2009, the contents of which are hereby incorporated by reference herein in their entirety.

BACKGROUND

1. Field

The present invention relates to a mobile terminal. Although the present invention is suitable for a wide scope of applications, it is particularly suitable for displaying at least one graphic user interface (hereinafter abbreviated GUI) on a standby picture.

2. Background

Recently, various application programs suitable for user's requests beyond the functionality off delivering speech only can be located in a mobile terminal owing to the technological development and data associated with the application programs are correspondingly usable. And, the corresponding data ranges include such personal information stored in the mobile terminal as schedule management, SMS (short message service) transceiving history and the like, such self-generated data generated via camera provided to the mobile terminal as photo, video and the like, such contents downloaded from a service provider's server as e-book, picture friends, bell sound, MP3 music and the like. In this case, the mobile terminal can include one of a wireless terminal, a personal digital assistant (PDA), a portable multimedia player (PMP) and the like.

Yet, in order to access a specific function or information via a mobile terminal, a user has to make several key inputs to cause inconvenience. Moreover, a user clumsy at terminal manipulation may have difficulty in accessing necessary information.

To solve the above mentioned problems, a dedicated key for executing a specific function in direct can be provided to a mobile terminal. Yet, it is substantially impossible to provide a mobile terminal with a number of dedicated keys for executing all functions necessary for a user. Besides, a dedicated key currently provided to a mobile terminal is limited to an execution of such a specific function as a digital broadcast reception, a camera, an MP3 player and the like.

In order to support and enhance the functionality of the mobile terminal, improvement of structural and/or software parts of the mobile terminal can be taken into consideration. For instance, a user input unit is provided to a mobile terminal to receive inputs of various types from a user.

Currently, a display unit of a mobile terminal is ongoing to develop into a large-scale size and high resolution and many efforts are made to utilize the display unit as a user input unit for diverse functionality. Recently, a graphic user interface tends to be utilized in playing a role as a dedicated key on a display unit.

Generally, such a graphic user interface as a widget is a service for supporting interactions between a user and an operational program/system more smoothly and enables a user to directly use a specific service on a standby picture within a terminal without visiting a portal service or content providing site one by one. This mobile widget providing service has a widget graphic tool represented on a display unit of a mobile communication unit. And, various kinds of sizes and shapes can be provided to the widget graphic tool. Since graphic user interfaces perform independent programs not to affect each other, graphic tools are arranged on a standby picture displayed on a display unit as many as the number of programs a user attempts to install.

In this case, since all graphic tools capable of performing various functions should be arranged to place limitation on a screen space, it may be inconvenient for a user to use. Moreover, in case that at least one graphic user interface is rearranged on a standby picture, each graphic user interface should be moved one by one.

BRIEF DESCRIPTION OF THE DRAWINGS

The embodiments will be described in detail with reference to the following drawings in which like reference numerals refer to like elements wherein.

DETAILED DESCRIPTION

Figure 1:
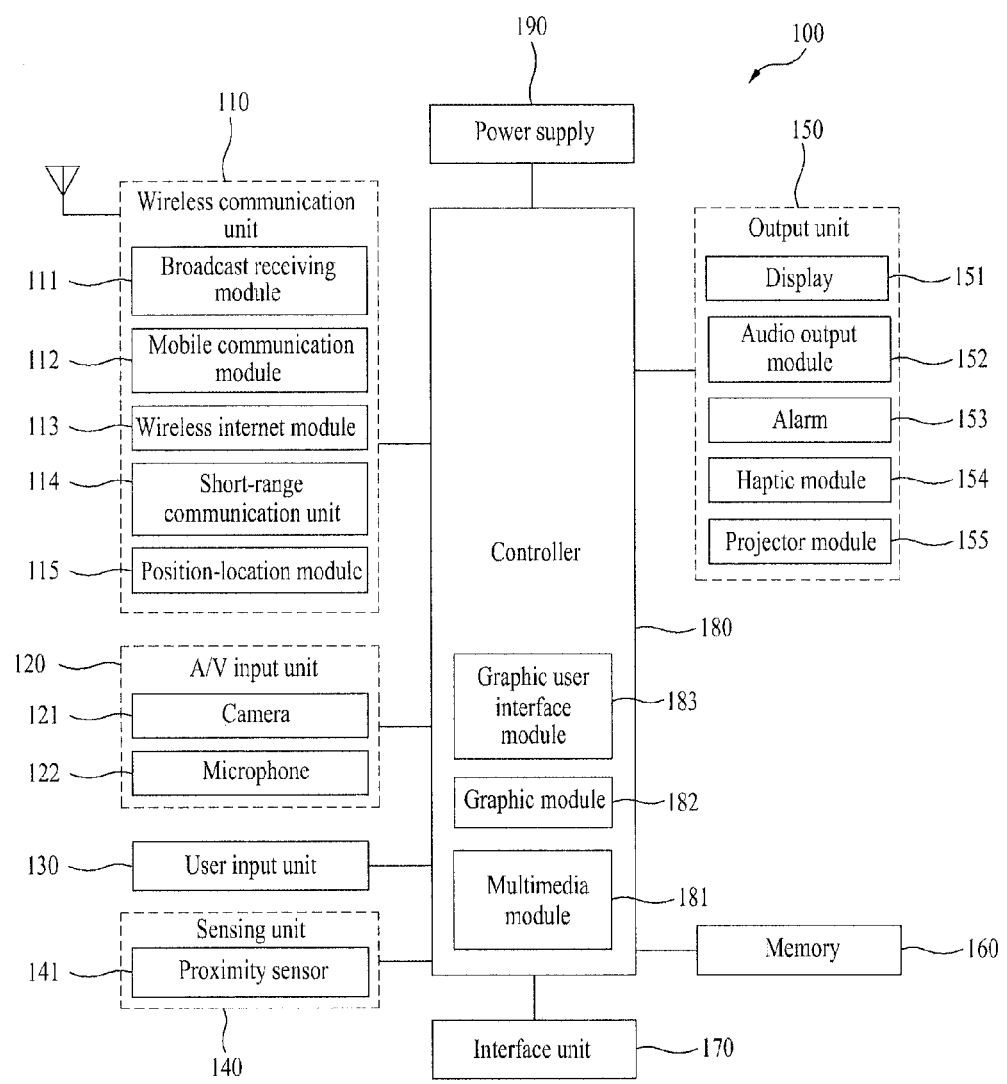
FIG. 1 is a block diagram of a mobile terminal according to one embodiment of the present invention.

Accordingly, the present invention is directed to a mobile terminal that substantially obviates one or more problems due to limitations and disadvantages of the related art.

An object of the present invention is to provide a mobile terminal, by which a user can be provided with convenience and visual pleasure in a manner that graphic user interfaces independent from each other are interlocked with each other through interaction.

Another object of the present invention is to provide a mobile terminal, which enables a user to directly obtain specific information in a manner that a plurality of graphic user interfaces for providing independent information can visually represent information another graphic user interface attempts to represent interactively.

A further object of the present invention is to provide a mobile terminal, by which graphic tools of a plurality of graphic user interfaces arranged on a standby picture of a display unit can be rearranged with ease through inter-graphic tool combination and/or separation control.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a display unit configured to display at least one or more graphic user interfaces on a display screen and a controller, if a state of one of the at least one or more graphic user interfaces is changed, controlling display states of the rest of the at least one or more graphic user interfaces except the state changed graphic user interface to be automatically changed.

Preferably, the graphic user interface can include either a widget or a gadget.

More preferably, when the state of one of the at least one or more graphic user interfaces is changed, the controller is able to control a shape of another graphic user interface or a standby picture to be changed. Alternatively, when a function of one of the at least one or more graphic user interfaces is executed or changed, the controller is able to control the display states of the rest of the at least one or more graphic user interfaces to be automatically changed.

Preferably, when a position of one of the at least one or more graphic user interfaces is changed, the controller is able to control the display states of the rest of the at least one or more graphic user interfaces to be automatically changed. In this case, the controller is able to control a change extent of a shape of each of the different graphic user interfaces to differ according to a spaced distance between the one of the at least one or more graphic user interfaces and each of the different graphic user interfaces.

More preferably, if the one of the at least one or more graphic user interfaces is a multimedia play relevant graphic tool, when a prescribed multimedia is being played back according to the multimedia play relevant graphic tool, the controller is able to control the different graphic user interface to vibrate visually. Moreover, when a prescribed multimedia is being played back, the controller is able to control a change speed of the display state to differ according to a music tempo of the multimedia.

Preferably, when the state of the one of the at least one or more graphic user interfaces is changed, the controller controls a popup window to be displayed on a prescribed region of a standby picture of the display unit and controls information related to the graphic user interface to be inputted as a default to the popup window.

In another aspect of the present invention, a method of controlling a mobile terminal according to the present invention includes a display unit configured to display at least one or more graphic user interfaces on a display screen and a controller controlling a presence or non-presence of a first graphic user interface and a second graphic user interface according to a spaced distance between the first graphic user interface and the second graphic user interface among the at least one or more graphic user interfaces (graphic tools).

Preferably, if the spaced distance is equal to or smaller than a predetermined distance, the controller controls the first graphic user interface and the second graphic user interface to be combined with each other.

Preferably, if the first graphic user interface and the second graphic user interface are dragged in different direction, respectively, if consecutive touch inputs applied to the first graphic user interface with a prescribed time interval are recognized, of if the second graphic user interface is dragged while the touch input to the first graphic user interface is maintained, the controller is able to control the first graphic user interface and the second graphic user interface to be separated from each other.

Accordingly, the present invention provides the following effects and/or advantages.

First of all, a user can be provided with convenience and visual pleasure in a manner that graphic user interfaces independent from each other are interlocked with each other through interaction.

Secondly, a user is enabled to directly obtain specific information in a manner that a plurality of graphic user interfaces for providing independent information can visually represent information another graphic user interface attempts to represent interactively.

Thirdly, graphic tools of a plurality of graphic user interfaces arranged on a standby picture displayed on a display unit can be rearranged with ease through inter-graphic tool combination and/or separation control.

It is to be understood that both the foregoing general description and the following detailed description of the present invention are exemplary and explanatory and are intended to provide further explanation of the invention as claimed.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Recently, indicators, each of which has such an information display function as an alarm mode set by a user via a standby picture, a presence or non-presence of a reception of a text or voice message, a battery level and the like, and various kinds of graphic user interfaces, each of which is capable of executing a specific content, can be displayed on a display unit of a mobile terminal.

Owing to the above indicators or the graphic user interfaces, a user can be aware of a state of the mobile terminal without performing several key inputs to access a specific function or information via the mobile terminal. Moreover, the user touches a specific one of various graphic user interfaces displayed on the standby screen and is then facilitated to manipulate the mobile terminal in a manner of executing an application content corresponding to the touched point in direct.

In this case, an indicator generally indicates stationary information such as a setting of a mobile terminal, a reception status of the mobile terminal and the like. If a user uses a specific function of the mobile terminal, the indicator indicates that the corresponding function is in progress. The indicator is displayed on a fixed region of a screen of a display unit. If a user attempts to execute a specific function or change an operational status, a separate menu search or a separate setting function should be used. Therefore, the indicator is distinguished from a graphic user interface configured to execute a program.

A graphic user interface, which supports interactions between a user and an application program executed in a mobile terminal includes an icon representing a program or shortcut as a simple drawing or the like to execute one of various programs or a widget displaying real-time information on a display unit by performing a program independent from an operational state of the mobile terminal using a separate window.

First of all, an icon should be set to be arbitrarily displayed on a display unit screen to facilitate an execution of a frequently used function of a mobile terminal. And, a displayed position of the icon can be randomly designated. As the function set to correspond to the icon is executed, a display or operational state of an application in progress is normally changed on the display unit.

Meanwhile, a widget is one of graphic interfaces configured to smoothly support interactions between a user and an application program/operating system or the like. The widget enables a user to directly use a specific service on a standby picture within a terminal without visiting portal services or content providing sites one by one. For example of the information or service provided via the widget, there are such a state of a mobile terminal as a memory space, a remaining battery level and the like, a service of receiving such real-time information received externally as weather information, traffic information, MSN messenger, stock exchange information, keyword search window and the like.

Regarding the widget, a user initially installs a widget for providing a specific service in a terminal by accessing a corresponding site and is then able to use the corresponding service on a standby picture of the terminal via the widget without visiting the corresponding website.

In the following description, according to embodiments of the present invention, 'graphic user interface' conceptionally provides visual information via a display unit and also includes an application for executing each function provided by a mobile terminal and all applications downloaded externally. Moreover, it is understood that a graphic user interface is conceptionally discriminated from the above mentioned 'indicator'.

As used herein, the suffixes 'module', 'unit' and 'part' are used for elements in order to facilitate the disclosure only. Therefore, significant meanings or roles are not applied to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-F), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (NV) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

In the following description, when at least one or more graphic user interfaces are displayed on a standby picture displayed on the display unit 151, if a state of a specific one of the graphic user interfaces is changed, the controller 180 of the mobile terminal according to the present invention can control a state change to be performed on the rest of the graphic user interfaces or the standby picture displayed on the display unit 151.

Figure 2A:
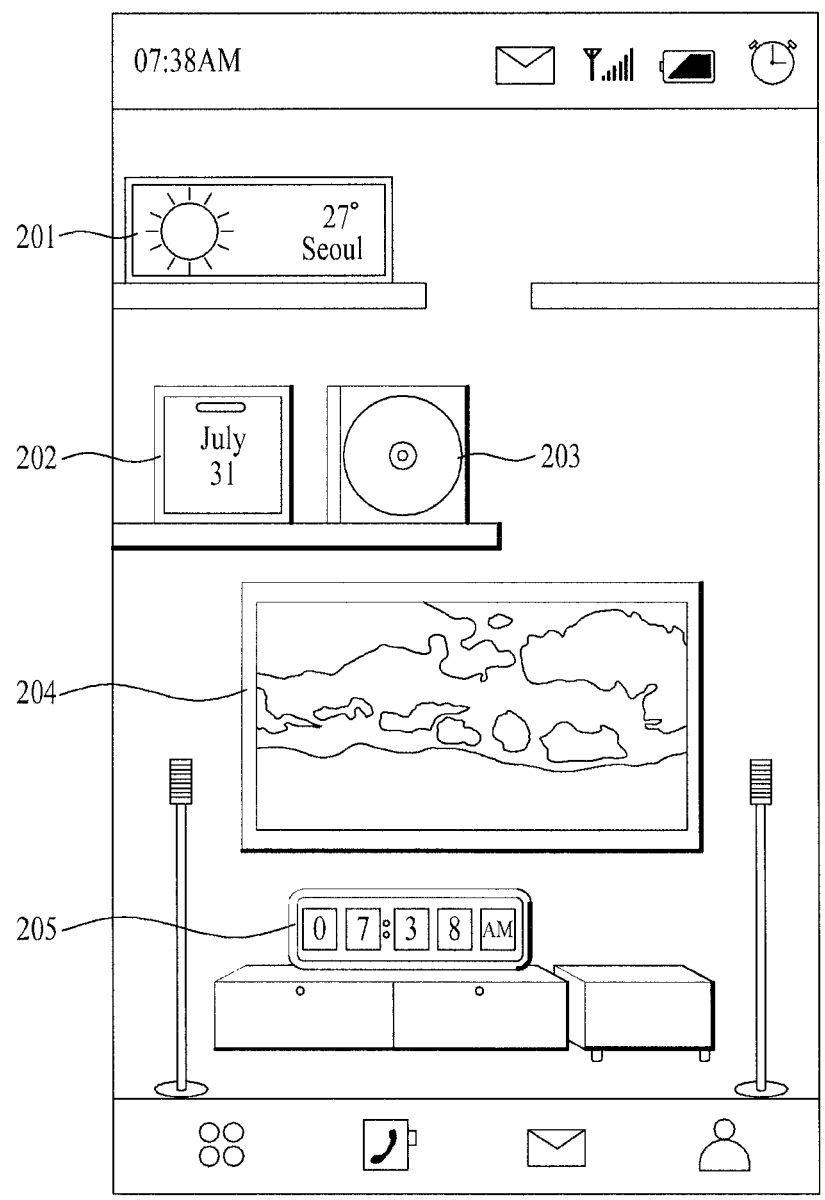
FIG. 2A and FIG. 2B are diagrams of a display unit of a mobile terminal according to one embodiment of the present invention, in which a display state is automatically changed according to a position change of one of at least one or more graphic user interfaces arranged on the display unit.
Figure 2B:
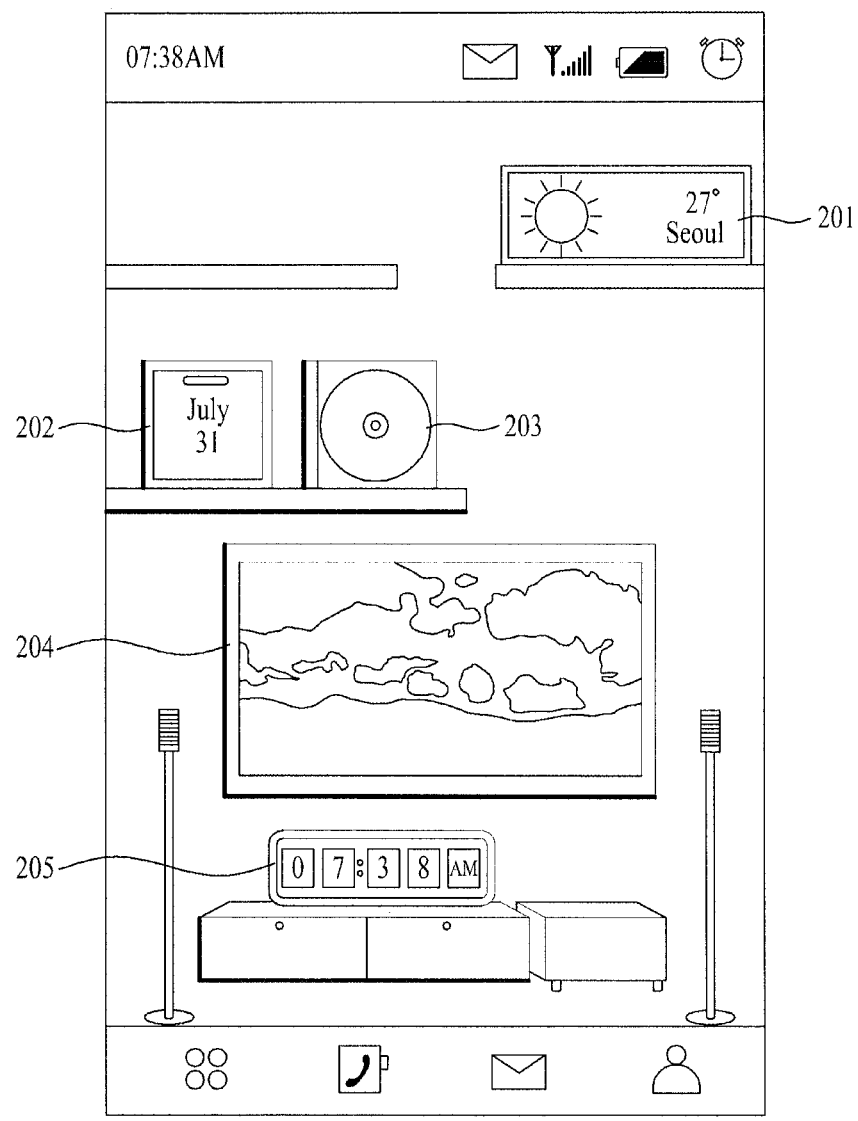

FIG. 2A and FIG. 2B are diagrams of a display unit of a mobile terminal according to one embodiment of the present invention, in which a display state is automatically changed according to a position change of one of at least one or more graphic user interfaces arranged on the display unit.

For the facilitation of the following description, an embodiment of the present invention is explained using a widget for example of a graphic user interface.

When at least one or more widgets are arranged on a standby picture displayed on a display unit, if a function execution or change of a random one of the widgets takes place, another widget is implemented to change its function or state. In this case, the random widget shall be named a specific widget.

Referring to FIG. 2A, a weather widget 201 indicating weather information, a calendar widget 202 indicating date information, a multimedia play widget 203 for playing such multimedia as music, video and the like, a photo widget 204 for displaying an image basically set by a user and a watch widget 205 indicating time information can be displayed on a standby picture of the display unit 151 by OSD (on screen display) according to a user setting.

Generally, the weather widget 201 indicating the weather information is able to represent a graphic tool represented on the standby picture in various ways according to such a weather state as a sunny day, a rainy day, a cloudy day, a snowing day and the like. Although the weather information changes by real time, it is able to set the weather information in a manner of discriminating a weather state using at least one category according to a predetermined reference. For instance, a user arbitrarily sets at least one category such as a sunny day relevant category, a rainy day relevant category, a cloudy day relevant category and the like and is then able to sort files and the like according to the categories.

In this case, in case that the weather widget 201 is set to 'specific widget', when a sun graphic indicating the sunny day is displayed, the graphic module 182 of the controller 180 is able to control brightness of the rest of the standby picture except the weather widget 201 on the display unit screen according to a position of the weather widget 201 or can control a shape, color and/or the like of another widget to be changed according to the position of the weather widget 201.

Referring to FIG. 2A, in case that the weather widget 201 is located at a left upper part of the standby picture, it is able to obtain an image effect as if the sun shines in left-top to bottom direction on the standby picture. Therefore, it is able to implement a contrast between light and shade in graphic of each of the widgets in a manner of representing an upper left part of a graphic tool of each of the calendar widget 202, the multimedia play widget 203, the photo widget 204 and the watch widget 205 as bright by receiving light and also representing the corresponding graphic tool as getting darker toward its lower right corner. Optionally, it is able to control a background image of the standby picture to be shaded and it is able to control a shadow graphic to be added to each of the widgets in direction opposing the weather widget 201. In case that the position of the specific widget is changed, a state of the standby picture can be changed as well.

Referring to FIG. 2B, in case that a position of the weather widget 201 is shifted to an upper right corner, the graphic module 182 of the controller 180 changes the shading direction. In particular, graphics of the rest of the widgets are controlled in a manner of implementing the shading by representing an upper right corner as bright and a lower left corner as dark, which is opposite to that of the implementation shown in FIG. 2A. Optionally, it is able to control a shadow of each of the widgets to be implemented in left direction.

Meanwhile, the controller 180 is able to control the standby picture state of the display unit 151 to be changed according to a state change as well as a position change of a specific widget.

Figure 3A:
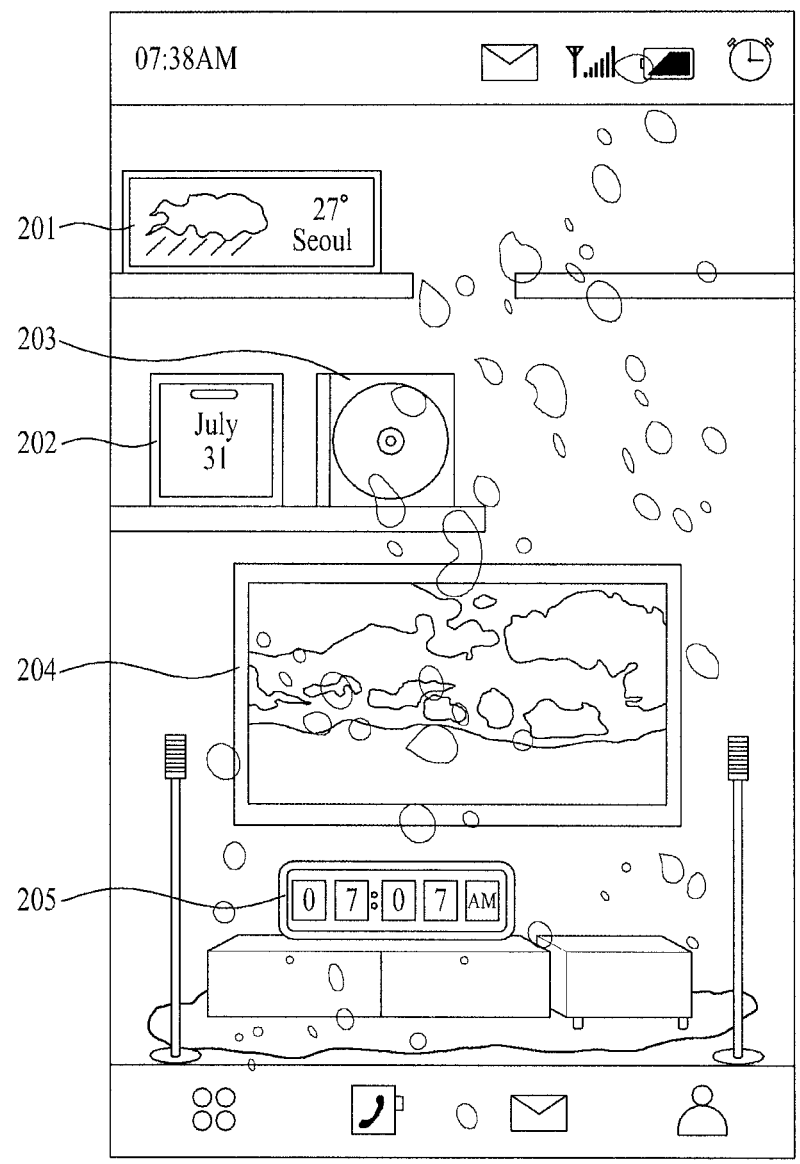
FIG. 3A and FIG. 3B are diagrams of a display unit of a mobile terminal according to one embodiment of the present invention, in which a display state is automatically changed according to a state change of one of at least one or more graphic user interfaces arranged on the display unit.
Figure 3B:
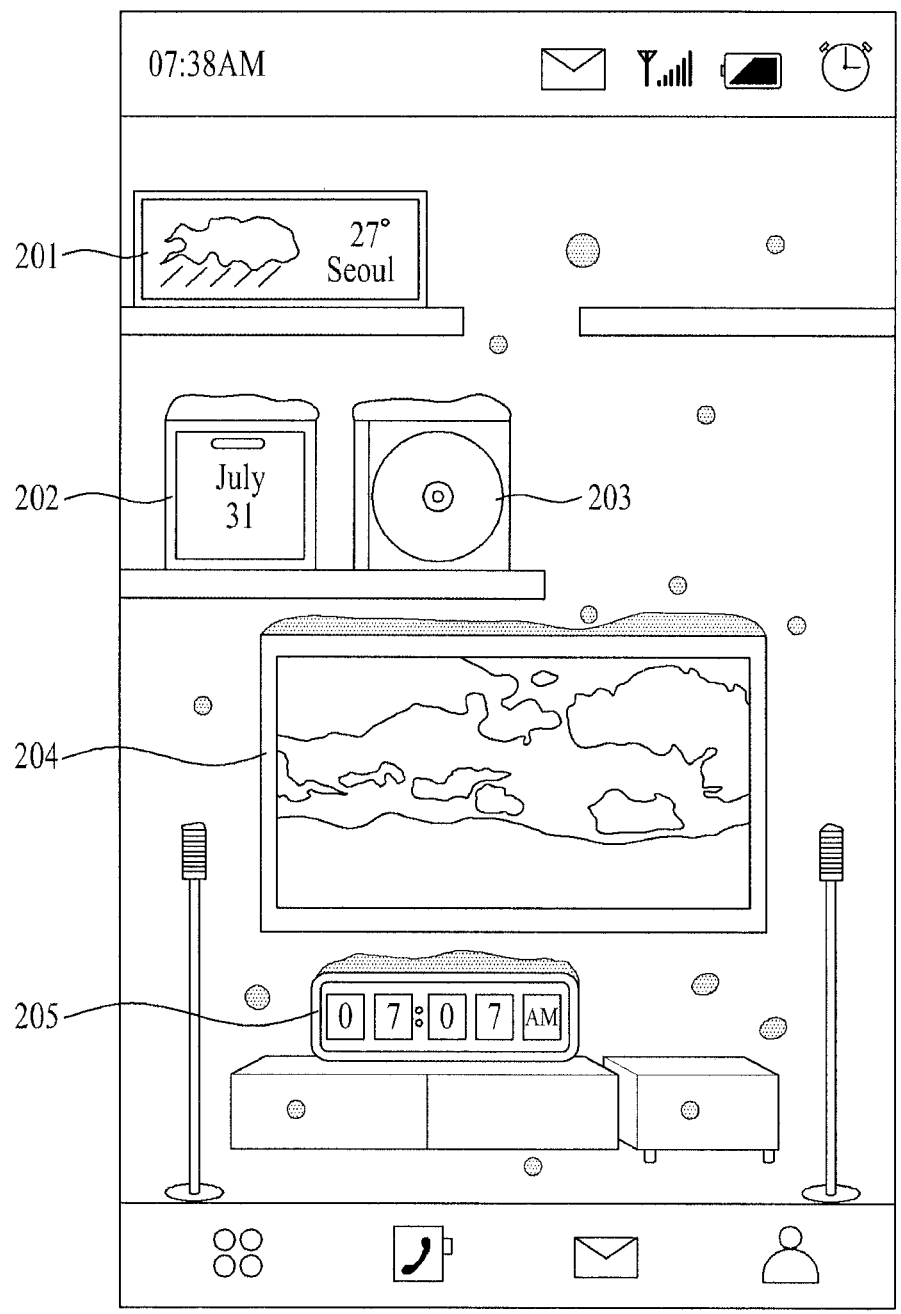

FIG. 3A and FIG. 3B are diagrams of a display unit of a mobile terminal according to one embodiment of the present invention, in which a display state is automatically changed according to a state change of one of at least one or more graphic user interfaces arranged on the display unit.

Referring to FIG. 3A, when the weather widget 201 displays a graphic indicating weather information on a rainy day, the graphic module 182 of the controller 180 is able to control a graphic indicating rainwater to be represented as stationary or dynamic on the standby picture. Moreover, the graphic module 182 of the controller 180 is able to control a rainwater graphic to be represented in a prescribed region of another widget including the calendar widget 202 or the multimedia play widget 203 or is able to control a graphic of water to be represented as flowing or stagnating in a bottom part of the standby picture. Optionally, by blurring a font displayed in each widget graphic, it is able to obtain an image effect that it is raining on the standby picture displayed on the display unit 151 as well.

Referring to FIG. 3B, in case that the weather widget 201 indicates the weather information on a snowing day, the graphic module 182 is able to represent a graphic of the snowing as stationary or dynamic on the standby picture. In this case, by adding a snow-piled graphic to a prescribed region of another widget, it is able to obtain an image effect as if the whole standby picture is affected by the snowing weather.

In this case, according to snowing or raining, illumination of a region affected by the corresponding weather widget can be adjusted weaker than that of a default state or a sunny day state on the display unit.

Thus, according to one embodiment of the present invention, between at least one graphic user interface for executing an independent program originally, a second graphic user interface is able to indirectly represent information provided by a first graphic user interface by a state change, a function addition or the like as well as its original function execution according to a function execution of the first graphic user interface.

In a mobile terminal according to the present invention, in order to control another widget to interoperate with a specific widget, in case that the specific widget is set to a weather widget, it is able to set at least one or more categories according to such a weather type as a shining mode, a raining mode, a snowing mode, a lightening mode and the like. And, a graphic relevant to a weather corresponding to each category can be stored in the memory 160. If so, the graphic module 182 of the controller 180 extracts such a random graphic as raindrops, snow and the like from the memory 160 according to the weather information, as shown in FIG. 3A or FIG. 3B, and then controls the extracted graphic to be displayed on the standby picture of the display unit 151. In doing so, it is able to set an additionally displayed graphic such as the raindrops, the snow and the like to a stationary image or a dynamic image of which position is variable in top or bottom direction on the standby picture of the display unit.

Figure 4:
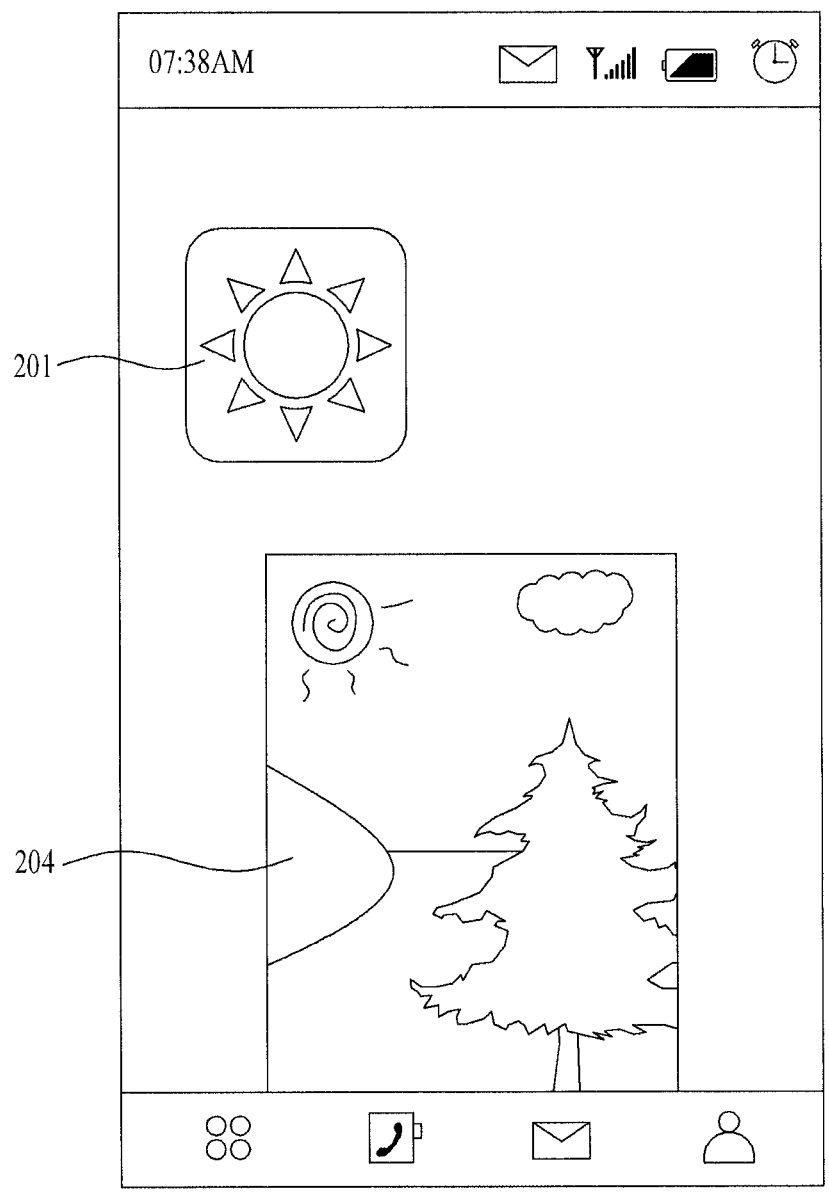
FIGS. 4 to 5B are diagrams of a display unit of a mobile terminal according to another embodiment of the present invention, in which a display state is automatically changed according to a state change of one of at least one or more graphic user interfaces arranged on the display unit.
Figure 5A:
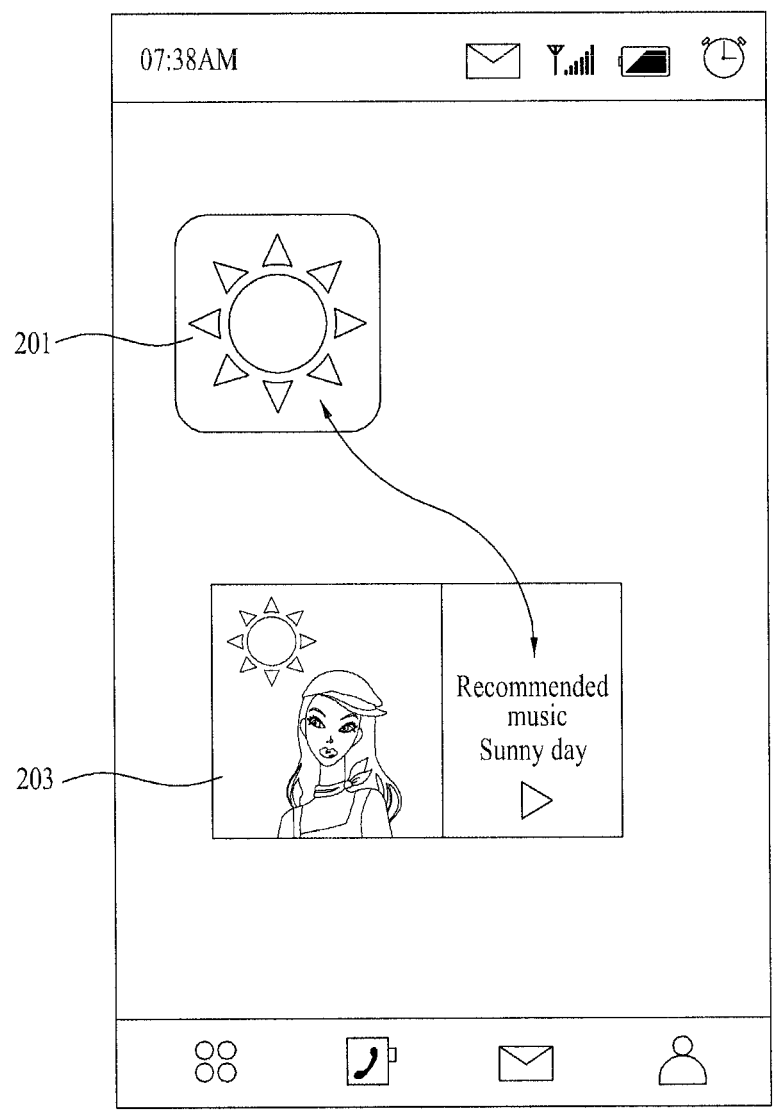
Figure 5B:
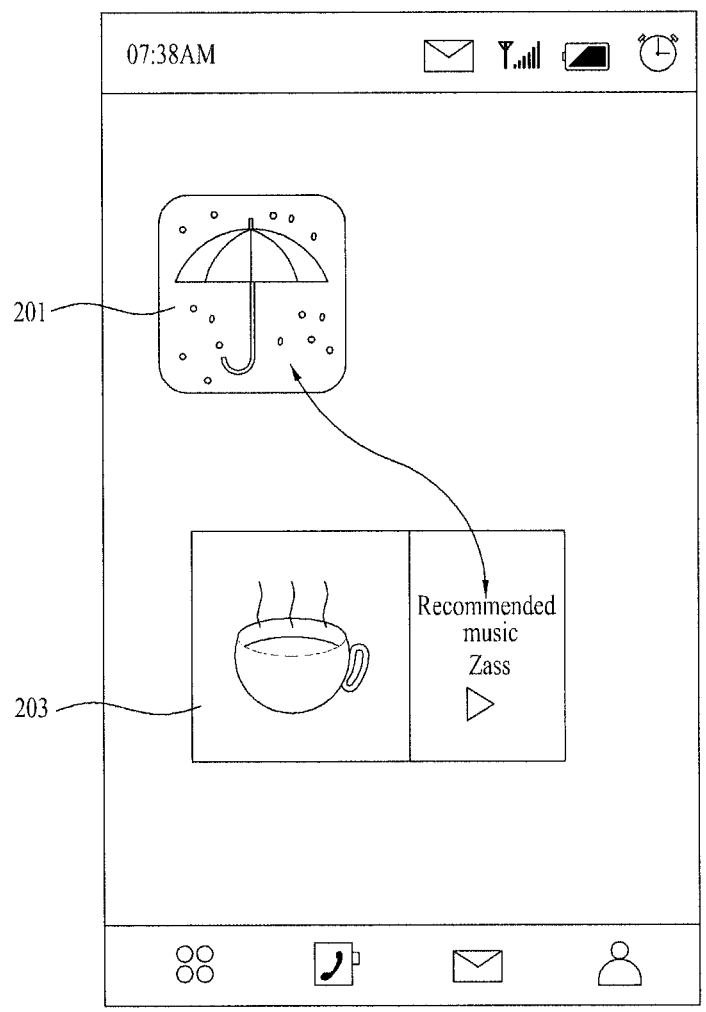

FIGS. 4 to 5B are diagrams of a display unit of a mobile terminal according to another embodiment of the present invention, in which a display state is automatically changed according to a state change of one of at least one or more graphic user interfaces arranged on the display unit.

First of all, in case that a specific widget is set to a weather widget, the graphic user interface module 183 of the controller 180 in the mobile terminal according to the embodiment of the present invention is able to control to change a graphic or information indicated by another widget graphic according to weather information indicated by the weather widget.

Referring to FIG. 4, if a user sets a weather widget and a photo widget, graphic tools off the weather widget 201 and the photo widget 204 are displayed on the standby picture of the display unit. Generally, the photo widget includes a graphic user interface having a function of displaying a photo uploaded to the mobile terminal by the user or a photo taken via the camera module of the mobile terminal on a prescribed region of the standby picture according to a user setting. In this case, one basically set photo can be controlled to keep being displayed. Alternatively, at least one photo can be displayed as a flash or slide.

According to the embodiment of the present invention, the graphic user interface module 183 of the controller 180 is able to control the photo widget 204 to change a displayed photo according to the weather information indicated by the weather widget 201. In order to enable the controller to perform a photo change control, a user sorts at least one photo with reference to at least one category for classifying the at least one photo to interact with various weather information, as mentioned in the foregoing description, and is then able to store the sorted at least one photo in the memory 160. If so, the graphic user interface module 183 is able to extract a random photo from a corresponding one of a plurality of photo categories stored in the memory 160 based on the weather information indicated by the weather widget 201. Afterwards, the graphic user interface module 183 is able to control the extracted photo to be displayed on the photo widget 204 or control a currently displayed photo to be replaced by the extracted photo.

Unlike the case shown in FIG. 4, in case that the weather widget 201 indicates information on a rainy day, the graphic user interface module 183 is able to control the photo widget to extract such a random photo as a rainy day photo from the category set to interact with the rainy weather or day and display the extracted photo.

Referring to FIG. 5A, in case that a user sets a weather widget and a multimedia play widget, graphic tools of the weather widget and the multimedia play widget are displayed on the standby picture of the display unit 151.

In this case, the graphic user interface module 183 is able to control a function or state of the multimedia play widget 203 to be changed according to the weather information indicated by the weather widget 201. For instance, if the weather information indicated by the weather widget 201 indicates a sunny day or weather, the multimedia play widget 203 extracts such a random music file as an exciting music from the category interacting with the corresponding weather information and then controls to switch to a recommended window. In doing so, a user is required to sort at least one music/video file according to at least one category and store it in the memory 160.

Referring to FIG. 5B, in case that the weather widget 201 indicates weather information on a rainy day or weather, the graphic user interface module 183 is able to select a category of selected jazz music set to interact with the weather information from the multimedia play widget 203. Subsequently, the graphic user interface module 183 extracts a random music file from the selected category and then controls a graphic of the multimedia play graphic to switch to a window for recommending the extracted music file. Since the above description is made on the assumption that a specific widget is a weather widget to describe the embodiment of the present invention in detail, a category set by a user needs not to be discriminated according to weather information. Instead, the category is randomly classified and set to interact by matching a state change off the specific widget.

According to another embodiment of the present invention, the graphic user interface module of the controller is able to control a multimedia player or a photo view function for configuring a standby picture among functions of the mobile terminal according to the aforesaid weather information indicated by the weather widget.

In a mobile terminal according to another embodiment of the present invention, a different widget is set to interact with a state change of a specific widget or a state of the different widget can be changed according to the state change of the specific widget.

Figure 6:
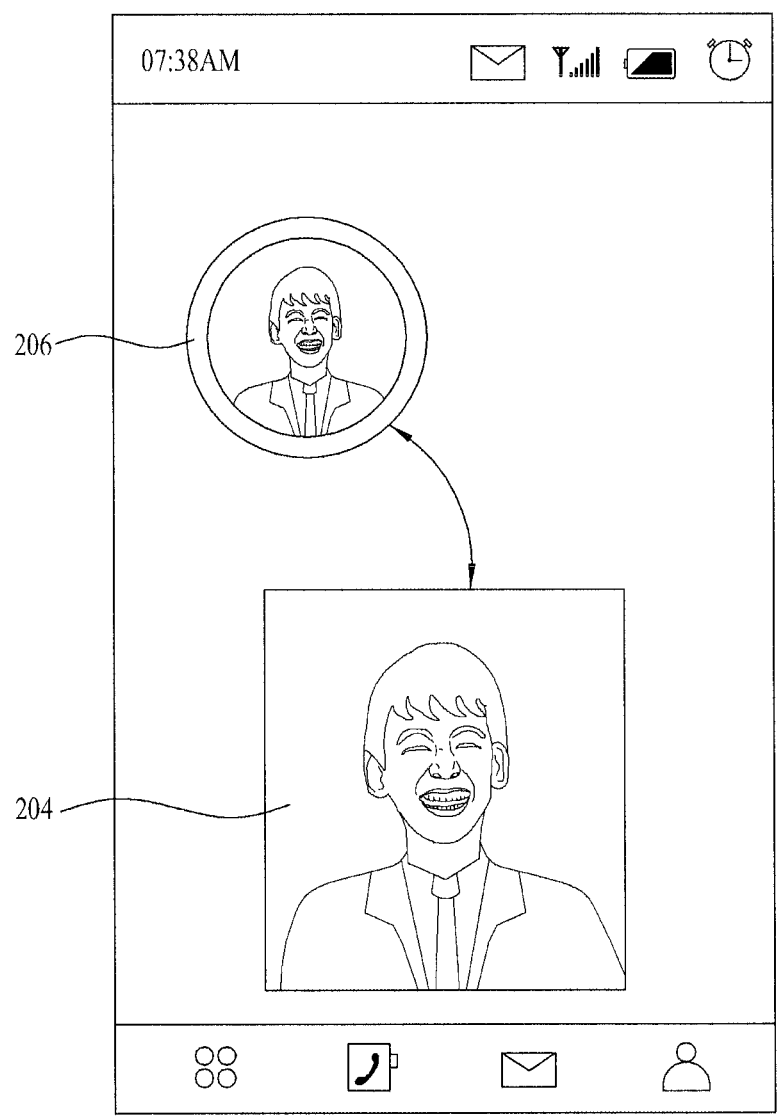
FIGS. 6 to 9 are diagrams of a display unit of a mobile terminal according to another embodiment of the present invention, in which a display state is automatically changed according to a function execution of one of at least one or more graphic user interfaces arranged on the display unit.
Figure 7:
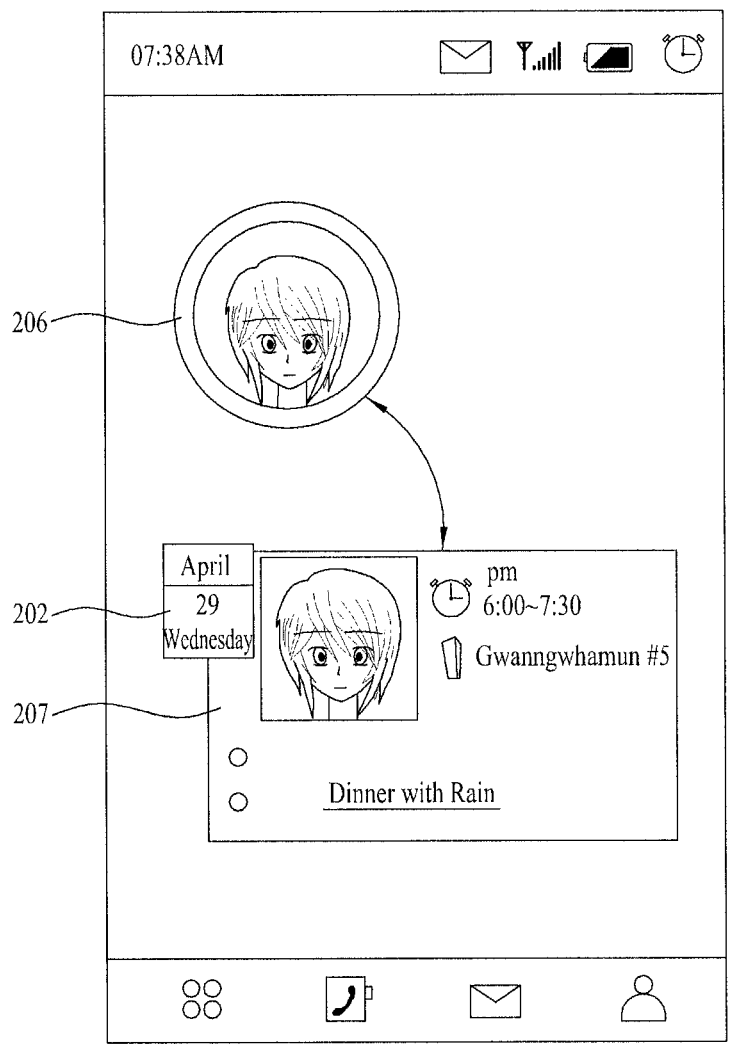

FIG. 6 and FIG. 7 are diagrams of a mobile terminal according to another embodiment of the present invention, in which at least one graphic tool is displayed. In particular, FIG. 6 and FIG. 7 show a state change of a different widget if a specific widget is set to a photo contact widget. In this case, the photo contact widget is a widget set to enable a photo of a specific person to be displayed on a standby picture of the display unit 151 by interacting with a contact of the corresponding person. Moreover, the photo of the corresponding person is downloaded externally or may be taken by the camera 121. The photo contact widget is discriminated from the photo widget in that a standby picture can be changed into a message input window to establish a call connection to a contact preset for a touched personal photo or send a text message to the preset contact, in case of being touched.

In FIG. 6, assume a case that a user sets a photo widget and a photo contact widget to be displayed on a standby picture of the display unit. When a photo of a specific person is displayed on the photo contact widget 206, the graphic user interface module 183 of the controller 180 controls a photo/video of the specific person to be displayed on the photo widget 204 as well. Alternatively, the graphic user interface module 183 of the controller 180 is able to control a photo/video originally displayed on the photo widget 204 to be changed into a photo/video of the specific person displayed in the photo contact widget 206.

Referring to FIG. 7, in case that a user sets a calendar widget and a photo contact widget, graphic tools of the calendar widget and the photo contact widget are displayed on a standby picture of the display unit. When a photo of a specific person is displayed on the photo contact widget 206, the graphic user interface module 183 of the controller 180 is able to control a schedule relevant to the specific person to be displayed as a separate window 207 on the calendar widget 202.

Optionally, using a widget having a memo function instead of the calendar widget 202, various kinds of information including a memo item relevant to the specific person and the like can be controlled to be displayed on a prescribed region of the standby picture displayed on the display unit.

In this case, a substantial schedule management is enabled in a manner that an item relevant to the specific person is displayed by interaction with the calendar widget without executing a separate widget having a diary function.

Therefore, widgets capable of performing separately independent functions are controlled to change their function executions according to the function execution of the photo contact widget supposed to perform the function related to the call connection or message sending to the specific person, whereby numerous manipulating steps for a user to execute at least one or more widgets can be reduced. And, the user can be provided with pleasure or convenience in performing the controlling steps. Moreover, since a separate widget needs not to be executed, degree of freedom in utilizing the display unit region can be enhanced. According to the above described embodiment, even if the photo widget is set instead of the photo contact widget, a calendar widget or a memo widget can be controlled to interact in association with a specific person displayed on the photo widget. Moreover, in case that a specific person is displayed on the photo widget or the photo contact widget, the graphic user interface module is able to control the music/video file, which is set in association with the specific person, to be played in the multimedia play widget.

In a mobile terminal according to another embodiment of the present invention, a state of a different widget ongoing to be executed in a standby picture of the display unit can be changed according to a state change of a specific widget.

Figure 8:
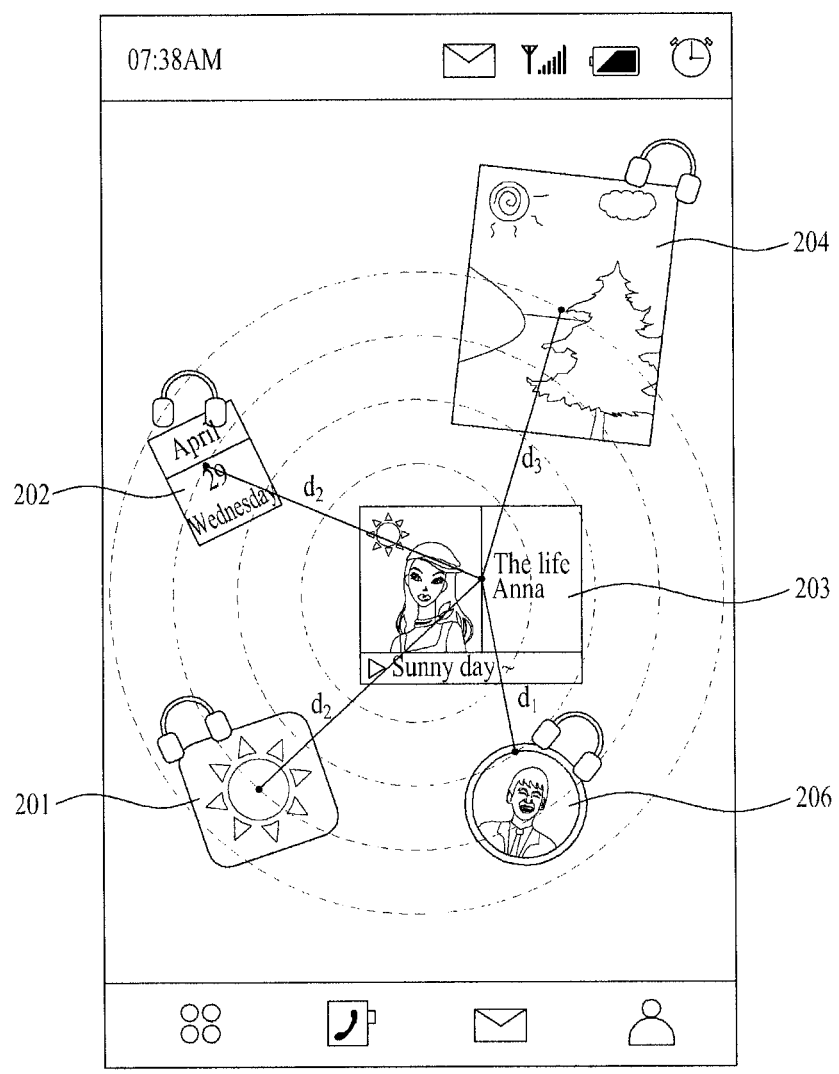
Figure 9:
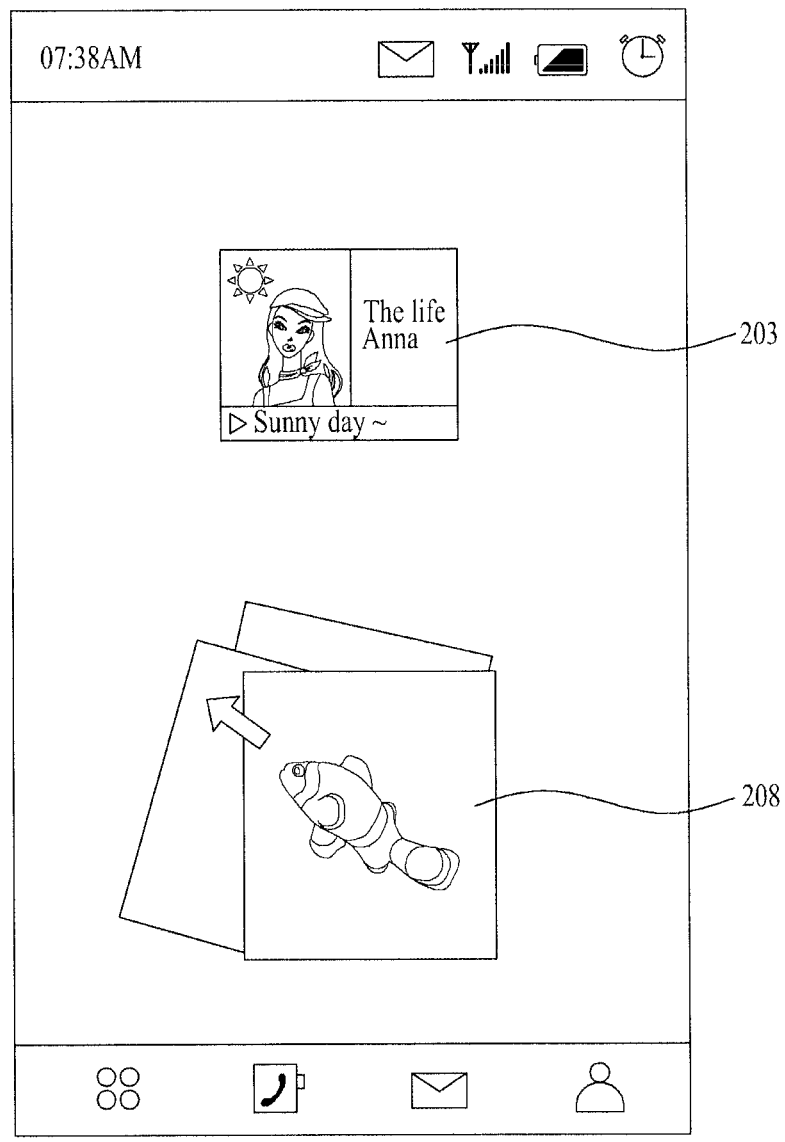

FIG. 8 and FIG. 9 are diagrams of a mobile terminal according to another embodiment of the present invention, in which at least one graphic tool is displayed. In particular, FIG. 8 and FIG. 9 show a state change of a different widget if a specific widget is set to a multimedia play widget.

Referring to FIG. 8, in case that a user sets a weather widget, a calendar widget, a multimedia play widget, a photo widget and a photo contact widget, graphic tools of the widgets set by the user are displayed on a standby picture of the display unit. When a music file is executed in the multimedia play widget, the graphic user interface module 183 of the controller 180 is able to control other widgets arranged on the standby picture to visually vibrate. In this case, it is able to control the rest of the widgets except the multimedia play widget to vibrate according to tempo of the music file played back in the multimedia play widget 203. Alternatively, each vibration speed of the rest of the widgets can be set different according to a distance from the multimedia play widget, whereby a deployed space between the at least one widgets can be utilized for display on the standby picture.

Referring to FIG. 8, with reference to the multimedia play widget 203, a distance from the multimedia play widget 203 to the photo contact widget 206 is set to d1. Thus, the photo contact widget 204 maintains is the shortest distance from the multimedia play widget 203 among other widgets arranged on the standby picture. On the contrary, the photo widget 204 is arranged in a manner of maintaining a longest distance d3 from the multimedia play widget 203. In this case, when a music file is played back in the multimedia play widget 203, if vibration speeds of the rest of the widgets are set in inverse proportion to a distance, it is able to control the vibration speed of the photo contact widget 206 to become a maximum speed. And, it is also able to control the vibration speed of the photo widget 204 to become a minimum speed. In this case, vibration speeds of the weather widget 201 and the calendar widget 202, each of which maintains the same distance d2 from the multimedia play widget 203, are equal to each other.

The vibration speed according to the music tempo can be set proportional or inverse proportional to an inter-widget distance. And, a vibration type can be set different according to the inter-widget distance like vertical vibration (top-to-bottom vibration) or horizontal vibration (right-to-left vibration). Moreover, even if a vibration of a same type is set according to distance, a vibration amplitude can be set different.

Moreover, while the multimedia play widget 203 is being executed, the graphic module 182 is controlled to add a graphic associated with a music play like a headphone to another widget graphic tool, thereby indicating that the music file is ongoing to be played back in the mobile terminal. The auxiliary graphic like the above headphone is previously set within the mobile terminal. Alternatively, the auxiliary graphic can be configured to enable the graphic module 182 to extract a random graphic in a manner that a user externally uploads various graphics to the memory 160.

Referring to FIG. 9, in case that a user sets a multimedia play widget and a photo widget, graphic tools of the multimedia play widget and the photo widget are displayed on a standby picture of the display unit.

As mentioned in the foregoing description, the photo widget can operate in a manner that at least one or more photos are consecutively displayed by flash or slide show. In doing so, a speed in replacing photos through the slide show can be controlled in a manner of being affected by the multimedia play widget 203. In particular, the graphic user interface module 183 is able to flexibly control the speed in displaying at least one or more photos consecutively on the photo widget 204 to become slow or fast by matching a tempo of a music file played back in the multimedia play widget 203.

Preferably, the slide show proceeding speed is set to maintain a basic speed irrespective of playback of a music file or can be set to be changed according to a tempo of a played music file. Thus, the slide show proceeding speed can be arbitrarily selected by a user.

Figure 10A:
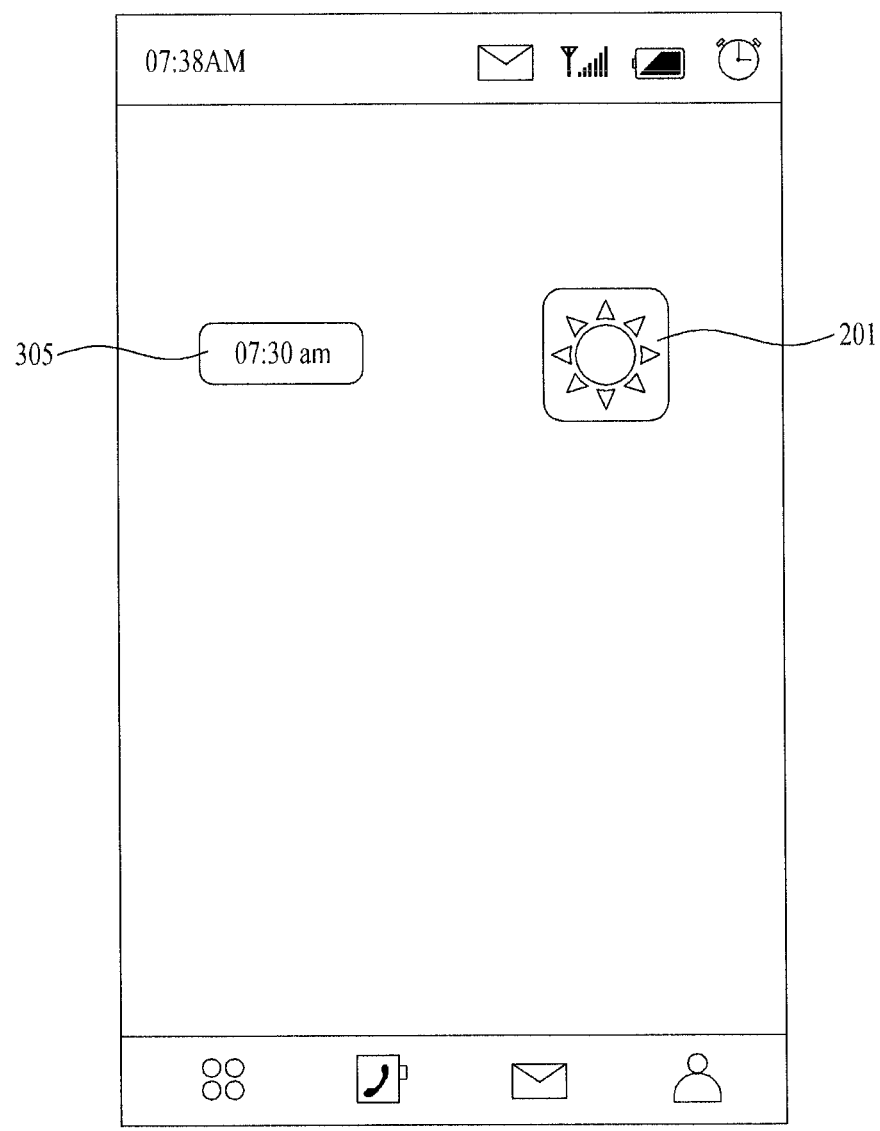
FIG. 10A and FIG. 10B are diagrams of a display unit of a mobile terminal according to a further embodiment of the present invention, in which a display state is automatically changed according to a function change of one of at least one or more graphic user interfaces arranged on the display unit.
Figure 10B:
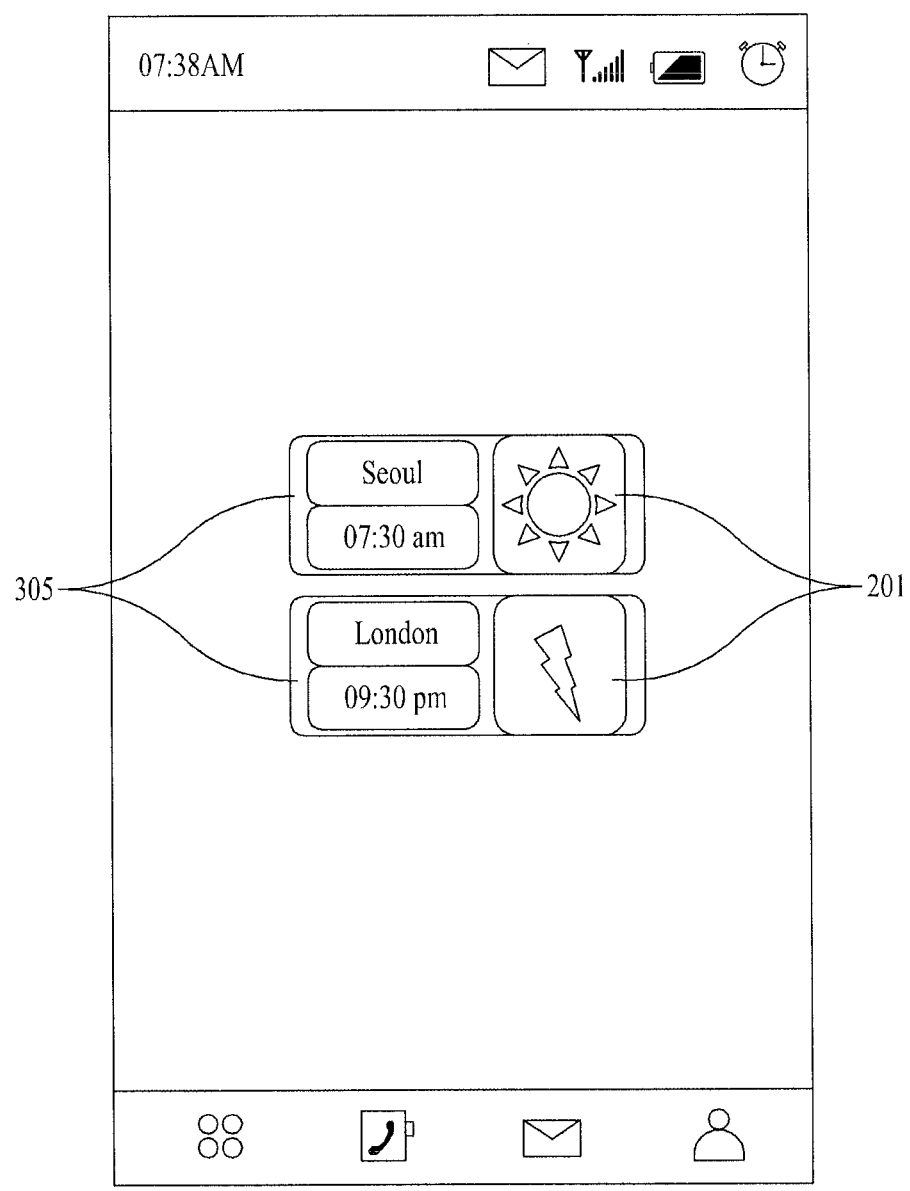

FIG. 10A and FIG. 10B are diagrams of a display unit of a mobile terminal according to a further embodiment of the present invention, in which a display state is automatically changed according to a function change of one of at least one or more graphic user interfaces arranged on the display unit. Particularly, FIG. 10A and FIG. 10B show a function change of a different widget if a specific widget is set to a watch widget.

Referring to FIG. 10A, in case that a user sets a weather widget and a watch widget, graphic tools of the weather widget and the watch widget are displayed on a standby picture of the display unit 151. In this case, weather information and time information displayed via the weather widget 201 and the watch widget 205 include the information adjusted with reference to an area where a mobile terminal is currently located.

In this case, referring to FIG. 10B, in case that a function of the watch widget 205 is set to a dual clock indicating time information on two areas, the graphic user interface module 183 of the controller 180 can control the weather widget 201 to enter a dual mode. In particular, the graphic user interface module 183 enables the weather widget 201 to change its function into a dual mode for displaying weather information on two areas displayed in the dual clock watch widget 205 simultaneously.

For instance, in case that a user is currently located in Seoul, when time information on London is displayed as dual mode in the basic setting of indicting time information and weather information on Seoul, weather information is displayed by being accompanied by area names of the two areas as well as time information.

Since users generally tend to frequently use the dual clock setting in a wrist watch, a desk watch or a mobile terminal, user's convenience can be enhanced in a manner that a weather widget in dual mode is set to interoperate with a dual clock mode.

According to a further embodiment of the present invention, a search function can be executed in a mobile terminal, which displays at least one or more widgets, in addition to a function execution of each of the at least one or more widgets.

For instance, a mobile terminal loaded with a position-location module is able to acquire location information on a location at which the mobile terminal is currently located. The mobile terminal is then able to display a map indicating a place, at which the mobile terminal is located, or a place a user attempts to search by setting a map widget on a standby picture displayed on a display unit.

Figure 11A:
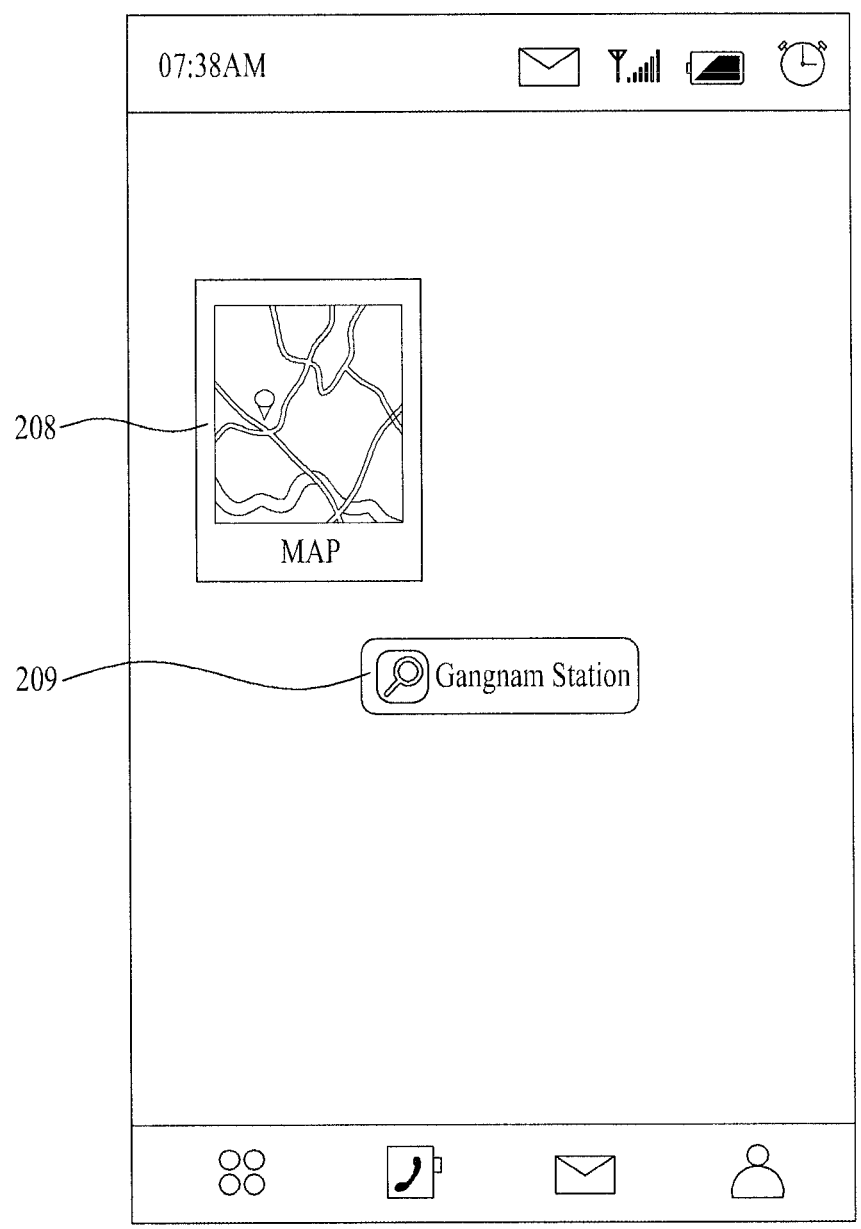
FIG. 11A and FIG. 11B are diagrams of a mobile terminal having a search service interact according to a function execution of a random user interface according to a further embodiment of the present invention.

Referring to FIG. 11A, if a user sets a map widget 208, the map widget is displayed on a standby picture and a place, at which a mobile terminal is located, is displayed via a map graphic tool. In doing so, the graphic user interface module 183 is able to control a separate search window 209, to which an area name having a mobile terminal located currently is inputted as a default, to be popped up. For instance, if a location of a mobile terminal is near Gangnam Station, an area name called 'Gangnam Station' is displayed as a default on the popup search window 209. Therefore, a user is facilitated to input such a search target as 'Gangnam Station restaurants', 'Gangnam Station language schools' and the like to the search window. In particular, a search service is implemented in a manner of automatically interoperating with the map widget, thereby enhancing user's convenience in using the search service.

Figure 11B:
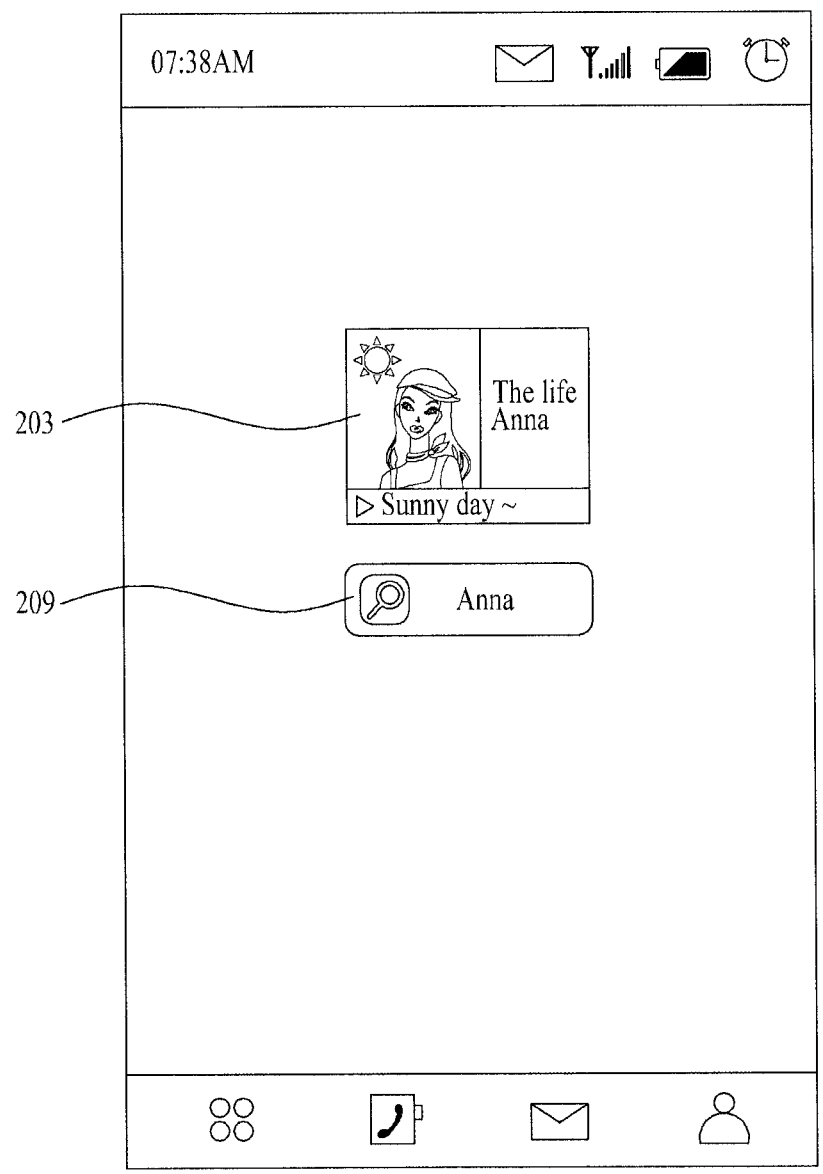

Similarly, referring to FIG. 11B, as a user sets a multimedia play widget 203, if a music file play is executed, the graphic user interface module 183 is able to control a separate search window 209 to pop up. In this case, such information relevant to a play music file as a music artist and the like is inputted as a default to the separate search window 209. In particular, the user enables a search service to interoperate with the multimedia play widget 203 to facilitate a use of a music file relevant information search service. Thus, the interoperation between a specific widget and a search service facilitates a use of a search service relevant to a specific person in a manner of interoperating with a photo widget or a photo contact widget as well as the above mentioned ma or multimedia play widget. Moreover, the pop-up search window can be implemented through a setting of a search service o a search widget.

According o a further embodiment of the present invention, in a mobile terminal displaying at least one or more widgets, f a position of at least one of the widgets is changed, another widget can move together with or by being interconnected with the position changed widget.

Generally, each widget is configured to execute an independent program. And, a user is able to arrange a graphic tool of at least one widget to execute at a prescribed position on a standby picture of the display unit 151. In case of attempting to change a position of a widget displayed on the standby picture, the user is able to move the widget in a manner of touching and dragging the corresponding widget to a target position. Yet, in case of moving a plurality of widgets, it is inconvenient for the user to move the widgets in a manner of touching and dragging each of the widgets.

To solve the inconvenience, when a plurality of widgets are arranged on a standby picture, in case of attempting to move a second widget closer to a first widget in a distance smaller than a predetermined distance, the controller 180 of the mobile terminal according to the present invention controls the first and second widgets in a manner of maintaining a visually combined state between the first and second widgets attracted to each other and enabling the first and second widgets to move together for rearrangement.

FIGS. 12A to 12D are diagrams of a mobile terminal according to a further embodiment of the present invention, in which at least one of at least one or more graphic user interfaces arranged on a display unit of the mobile terminal is rearranged by combination or separation.

Figure 12A:
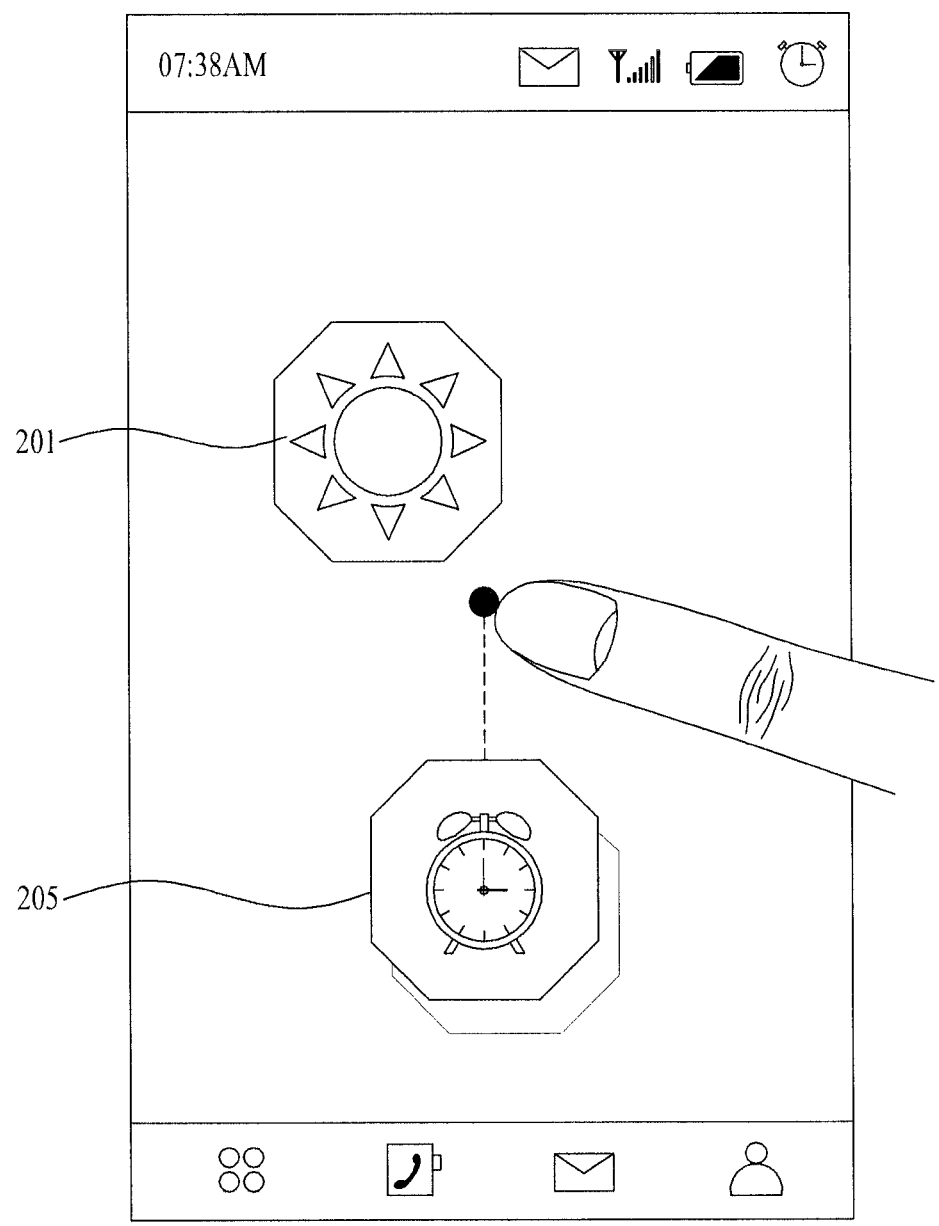
FIGS. 12A to 12D are diagrams of a mobile terminal according to a further embodiment of the present invention, in which at least one of at least one or more graphic user interfaces arranged on a display unit of the mobile terminal is rearranged by combination or separation.
Figure 12B:
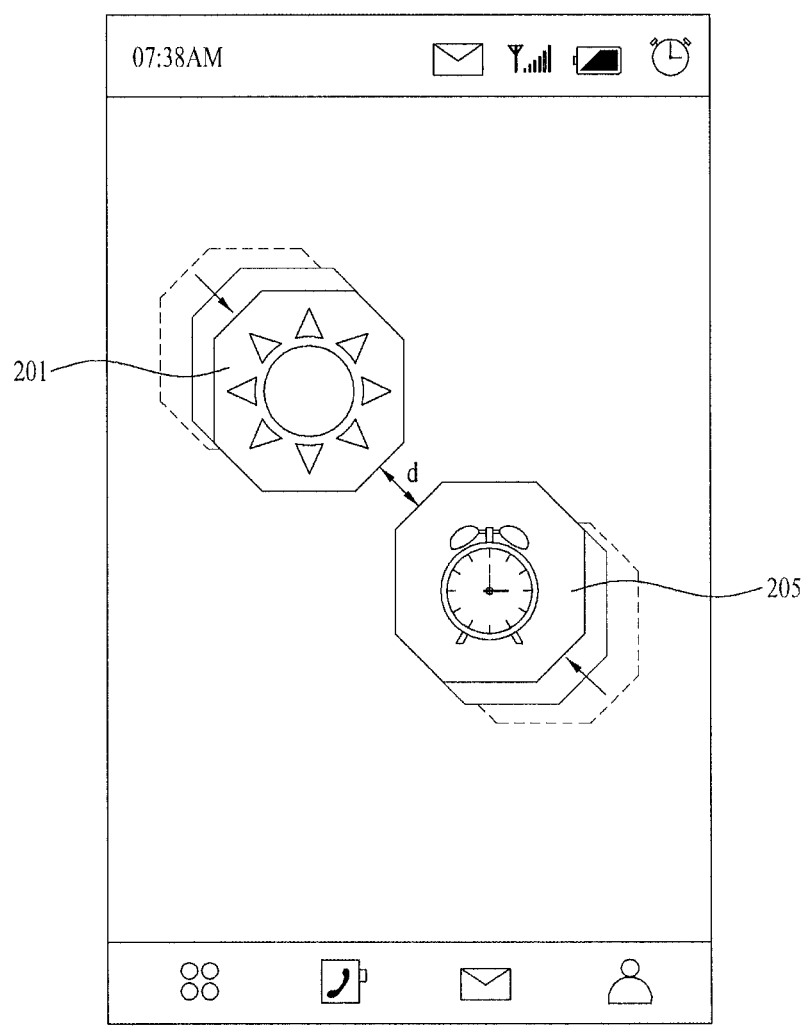

Referring to FIG. 12A, graphic tools indicating a weather widget 201 and a watch widget 205 are displayed on a standby picture in a manner of maintaining a prescribed distance in-between. Afterwards, a user is able to drag the watch widget 205 closer to the weather widget 201 while touching the watch widget 205. In due course, referring to FIG. 12B, if the watch widget 205 gets closer to the weather widget 201 in a distance smaller than a predetermined distance, the watch widget 205 and the weather widget 201 attract each other to maintain a combined state in-between.

Figure 12C:
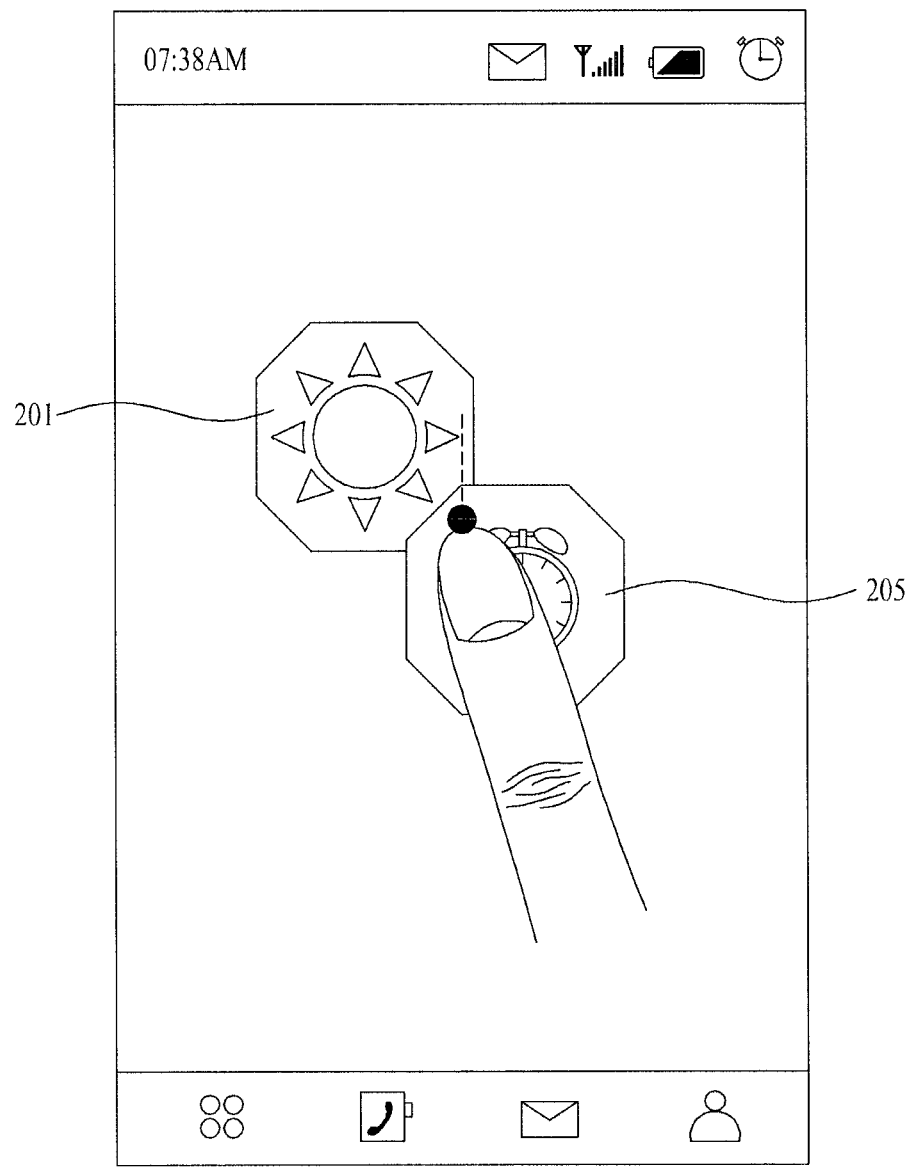

The combined two widget graphic tools, as shown in FIG. 12C, move together if a user touches and drags a prescribed portion of the widget graphic tool. Therefore, the user is able to simultaneously move at least two widgets to another prescribed position. In doing so, the combined two widgets keep executing independent programs, respectively. Therefore, the user can touch one of the widgets irrespective of the contact type between the graphic tools in order to execute a specific one of the widgets.

Figure 12D:
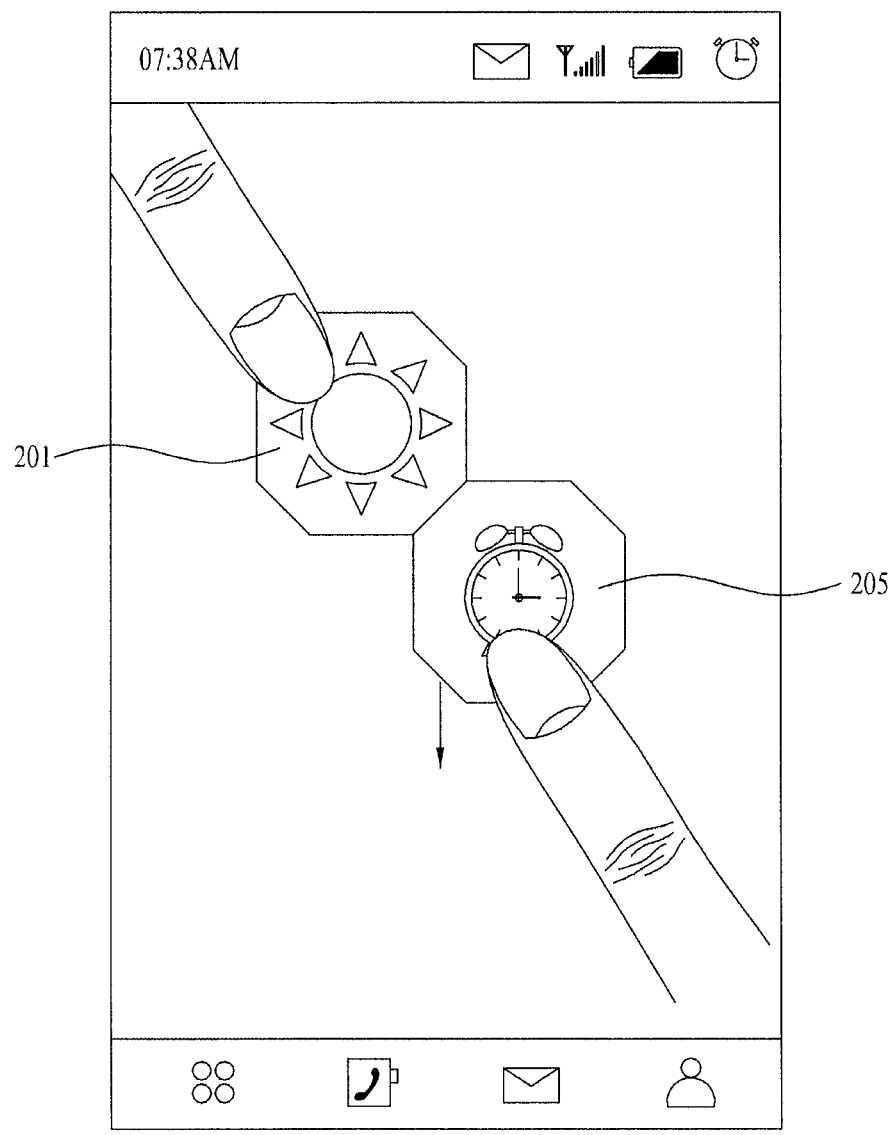

The combined widgets can be separated from each other in a manner shown in FIG. 12D. First of all, while a user touches the weather widget 201, if the user drags the watch widget 205 to a specific position, the combined graphic tools are separated from each other. Alternatively, the combined widgets can be separated from each other in a manner of dragging each of the weather widget and the watch widget in a specific direction by multi-touch. Alternatively, the combined widgets can be separated from each other in a manner that one of the combined graphic tools is multi-touched and then dragged.

Accordingly, the present invention provides the following effects and/or advantages.

First of all, a user can be provided with convenience and visual pleasure in a manner that graphic user interfaces independent from each other are interlocked with each other through interaction.

Secondly, a user is enabled to directly obtain specific information in a manner that a plurality of graphic user interfaces for providing independent information can visually represent information another graphic user interface attempts to represent interactively.

Thirdly, graphic tools of a plurality of graphic user interfaces arranged on a standby picture displayed on a display unit can be rearranged with ease through inter-graphic tool combination and/or separation control.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein but intends to give a broadest scope matching the principles and new features disclosed herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a display unit to display a plurality of graphic user interfaces on a screen; and
   a controller, when a state of a first one of the graphic user interfaces changes, to control at least one of a display type, an applied visual effect or a played content of at least a second one of the graphic user interfaces displayed on the screen corresponding to the state of change of the first graphic user interface,
   wherein the state of change of the first graphic user interface includes one of a change of visual information of the first graphic user interface, a distance change from the second one of the graphic user interfaces, a type of change of a content played via the first graphic user interface, or a change of volume or sound range characteristic of the played content,
   wherein the first graphic user interface includes a multimedia play relevant graphic user interface, and
   wherein the visual effect applied to the second one of the graphic user interfaces includes one of a vibration effect of the second one of the graphic user interface to be changed corresponding to the changed distance of the first graphic user interface, and a change of speed of the second one of the graphic user interfaces to correspond to a music included in a multimedia content played via the multimedia play relevant graphic user interface.

2. The mobile terminal of claim 1, wherein the graphic user interface comprises a widget or a gadget.

3. The mobile terminal of claim 1, further comprising a wireless communication unit to receive a wireless signal, wherein the controller controls the state of the first graphic user interface to change based on information received via the wireless communication unit.

4. The mobile terminal of claim 1, wherein the display unit includes a touchscreen to receive a touch input, and wherein the state of change of the first graphic user interface corresponds to the touch input applied to the touchscreen.

5. The mobile terminal of claim 1, wherein the vibration effect applied to the second one of the graphic user interfaces performs proportional or inversely proportional to the distance of the graphical user interface.

6. The mobile terminal of claim 1, wherein the controller controls a change of speed of the second one of the graphic user interfaces to correspond to a tempo of a music included in a multimedia content played via the multimedia play relevant graphic user interface.

7. The mobile terminal of claim 1, wherein when the state of the first graphic user interface changes, the controller controls a popup input window to be displayed on a prescribed region of the screen, and wherein a value corresponding to the changed state of the first graphic user interface is inputted as a default to the input window.

8. A mobile terminal comprising:
   a display unit to display a plurality of images of a screen;

a device to receive information regarding a first one of the images on the screen; and a controller to change the first one of the images on the screen based on the received information and to change one of a display, a visual effect, a played content or an arranged position of a second one of the images on the screen based on the received information, wherein the controller changes a state of change of the second image by one of a change of visual information of the first image, a change of a position at which the first image is displayed on the screen, a type of change of a content played via the first image, or a change of volume or sound range characteristic of the played content, wherein the first one of the images includes a weather widget to display weather information received via a wireless communication unit, wherein the controller controls a prescribed visual effect corresponding to a weather indicated by the weather widget to be applied to at least one region of the screen, and wherein the at least one region includes a region of the screen on which the second one of the images is displayed, wherein when the weather indicates sunny weather, the controller controls a sun figure to be displayed on the weather widget and also controls an illumination effect to be applied to the at least one region based on a relative position against the sun figure, wherein when the weather indicates rainy weather, the controller controls at least one of a raining effect, a dimming effect, or a water stagnating effect based on a rainfall and a screen blurring to be applied to the at least one region, and wherein when the weather indicates snowing weather, the controller controls at least one of a snowing effect, a dimming effect, or a snow piled effect based on a snowfall to be applied to the at least one region of the screen.

9. The mobile terminal of claim 8, wherein the wireless communication unit to receive a wireless signal, wherein the controller changes the first image based on information received via the wireless communication unit.

10. The mobile terminal of claim 8, wherein the display unit includes a touchscreen to receive a touch input, and wherein the controller changes the first image to correspond to the touch input applied to the touchscreen.

* * * * *